April 5, 1949.  P. J. BURCHETT  2,466,576
COUPLING DEVICE

Filed July 8, 1946  2 Sheets-Sheet 1

INVENTOR.
PAUL J. BURCHETT
BY George J. Smyth
ATTORNEY

April 5, 1949.  P. J. BURCHETT  2,466,576
COUPLING DEVICE

Filed July 8, 1946  2 Sheets-Sheet 2

INVENTOR.
PAUL J. BURCHETT
BY George J. Smyth
ATTORNEY

Patented Apr. 5, 1949

2,466,576

UNITED STATES PATENT OFFICE 2,466,576

COUPLING DEVICE

Paul James Burchett, Altadena, Calif.

Application July 8, 1946, Serial No. 682,083

16 Claims. (Cl. 24—71.1)

This invention has to do with coupling devices and is more particularly concerned with devices for disconnectibly connecting tension members, such as cables.

The present device is eminently suited for employment to disconnectibly connect, end-to-end, such relatively small, flexible cable runs as are utilized in aircraft control systems; but, as hereinafter manifested, it is not limited to such use, for it is well fitted for connecting flexible tension members of any size or type.

The present connector is a development and improvement of the connector described in my copending application, Ser. No. 605,737, filed July 18, 1945. In that application, there is disclosed a connector essentially comprising a pair of cable-terminators in which the ends of the cable sections are socketed, these terminators ending inwardly of the connector in hooked portions included between and embraced by two parallel, spaced plates. Each plate has, on its inner face only, near each end thereof, a slot that is substantially arcuate in shape. Each arcuate slot is centered about a point lying laterally outwardly displaced only a short distance from the longitudinal axis of the plate. The innermost ends of these slots, however, lie an appreciable distance away from that axis. The outer ends of the slots, at the ends of the parallel plates, lie in vertical registry and are adapted to engage a pin projecting from each face of the end of the hooked portions that are embraced by the plates. A post is centrally attached at each of its perpendicularly extending ends to the adjacent one of the parallel plates, and when this post is rotated, the plates are rotated thereby. Thus, the pins are cammed into the inner ends of the slots and the hooks are thereby brought around opposite sides of the post, establishing the connection between the adjacent ends of the cables.

Although the aforementioned article satisfactorily accomplishes its objects, the present connector incorporates certain novel concepts and improved constructional features leading to improved results and economies in fabrication. It includes, first, a pair of outer links, each having the general nature of an elongate, flattish laminar member which, in one embodiment, may consist of a pair of parallel metallic plates spacedly united together at their inner and outer ends, and which, in another embodiment, are constituted by a single piece of metallic ribbon-stock bent inwardly upon itself, the inner ends only being spacedly united. Secondly, in both embodiments, these links are adapted, at their outer ends, to anchor the adjacent ends of the seriate cable-sections to be united, and are adapted at their inner ends to oppositely overlap and embrace a single, substantially oblong, actuating or camming plate disposed in the longitudinal center-plane of the connector. These inner ends are oppositely hook-shaped, the hooks interfitting laterally when the links are engaged around a substantially central post extending transversely perpendicularly to the actuating plate. The actuating plate includes curvilinear slots pierced therethrough and extending towards the center of the plate from the longer sides of the plate near opposite ends thereof, the slots curving reversely to each other.

The aforementioned spaced union of the inner ends of the plate-like members constituting each link is constituted by a perpendicular pin which is adapted to engage in the slot formed in the end of the actuating plate embraced by the hooked inner end of each link. The post on the camming plate is relatively massive and is headed to facilitate torque-engagement, and the opposite end portions of its shank are adapted to be embraced by the hooked-ends of the links. When this post is rotated substantially a half-turn, the actuating plate united thereto revolves substantially 180° from its original position and cams the pins from the outer ends of the slots into their inner ends. This action moves the hooked portions of the links in arcuate paths and draws the cable ends together, and compressively engages the hooks in contact with opposite sides of the post, establishing the connection.

Thus, the present invention requires but one actuating plate and this plate is located medially of, and is embraced by, the hooks themselves. The single actuating plate is relieved of all loads except during opening and closing, the plate being subjected to none of the tensile strain from the cable, as all such loads are taken directly by the post member. Because of the novel shape and location of the camming slots, all the members of the connector lie in alignment with the cable when the device is closed, and none protrude from the cable alignment or extend diagonally with reference thereto. Consequently, not only is the lateral and transverse extent of the connector reduced to the minimum, but the actuating plate is relieved of nearly all torsional strains, as well as of tensional ones.

To positively hold the actuating plate of the connector against rotation after the plate has been rotated to establish the connection, means are provided for engaging and locking the post carried by the actuating plate against accidental movement. This means in one embodiment of the invention is movably carried by the connector and can be moved into locking engagement with the post after the connection has been made. In other embodiments of the present invention illustrated herein the locking or safety device is detachable from the connector when not in use.

Built-in, manually operable, lever-like actuator means for enabling rotation of the post and actuating plate may also be included in the construction of the camming plate and post if desired. This actuator may be incorporated in addition to, or in lieu of, the headed member provided on the post for cooperation with an end wrench in operating the connector.

Despite the manifest effectiveness, security and dependability of the connector, it can be easily and quickly closed and opened to connect the cables, requiring only a slight amount of operating force to do so, and this force may be either directly applied to the lever-like actuator by the fingers, or, if desired, a simple end wrench may be used on the headed end of the operating post.

Considering the wide range of applicability of the connector and its complete reliability in all of its fields of utilization, it comprises but a relatively small number of parts, and each part is simple, none of the components requiring precision machine work. The device is hence well adapted for rapid and inexpensive production on the large-quantity scale.

Solely by way of exemplification, several of the presently-preferred embodiments of the foregoing and other inventive concepts are illustrated in the accompanying drawings and described hereinbelow in conjunction therewith. It is to be understood, however, that the invention is by no means limited in the forms which it can assume, either by said drawings or said description, as it is susceptible to changes of its construction taking the form of any of the variants lying within the scope of the annexed claims.

Figure 1:
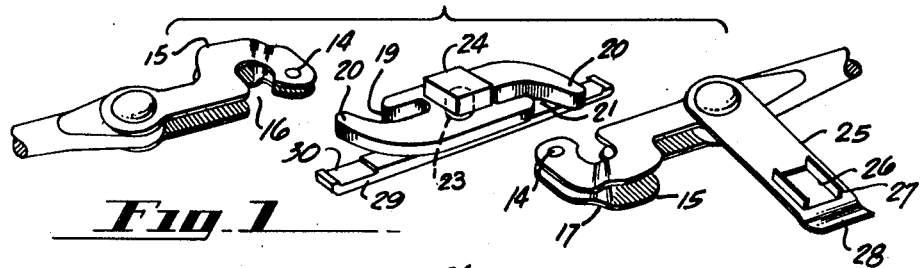
Figure 1 is an exploded view of the presently-preferred species of the connector.
Figure 2:
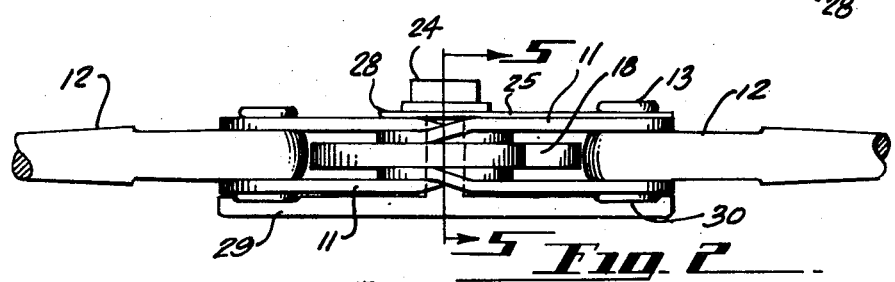
Figure 2 is a side elevation thereof in its service condition.

Referring now more in detail to the constructional aspects of the invention, the form depicted in Figures 1-5, inclusive, is well-suited for disconnectibly connecting seriate cable sections that terminate adjacently to the connector as eye-rod terminators or cable fittings of appreciable thickness. This embodiment constitutes the species at present best adapted to engineered usages, and for this reason may be considered the preferred embodiment.

To this end and others, this form of the connector essentially comprises a pair of outer members 10, in effect constituting links, each consisting of two parallel, similar plates 11. The plates of each link are spacedly united at their outer ends over an eye-loop in each of the cable terminators 12 by means of clevis pins 13, or similar fastening means, and are similarly spacedly-united at their inner ends by means of pins 14.

Each of the plates in each link is laterally enlarged at one side of its inner end, as shown at 15, the opposite side of said end being kerfed, as at 16, thereby constituting these ends, digital, or hook-like, members. The hooked end of each link is adapted to be received transversely in between the vertically-spaced plates forming the other link, on occasion, by virtue of the presence of transversely-joggled formations 17 disposed at the inturning portion of each hook. These formations enable the inner or end portion of one link, comprised of the parallel, spaced or laminar plates, to fit between the plates of the adjacent link, as most clearly shown in Figure 2.

An actuating or camming plate 18 lies in the longitudinal center, or medial, plane of the connector, and is embraced by the constricted or joggled-together inner ends of the link members. The member 18 in effect constitutes the central "link" of the connector, the members 10 in effect constituting the outer "links" thereof. The member 18 essentially comprises a generally oblong plate preferably having a relatively large longitudinal, or camming, dimension, in order to adapt it for fields where it is necessary to draw, and connect, cables that are rigged with an unusually large amount of slack.

Beginning on opposite sides and near each of the opposite ends of the plate 18, a curvilinear but non-arcuate, slot or channel 19 is provided, and each of these slots extends first substantially transversely of the plate on a gentle curve reaching almost to the longitudinal axis of the plate, and then extends centerwardly of the plate, parallel to and only slightly offset laterally outwardly from, the longitudinal center line of the plate. The inner "run" of each slot is hence straight and terminates only a short longitudinal distance from the center of the plate.

These slots hence define at one end of each of the longer sides of the plate, an outwardly extending finger 20. The entrance, or mouth, 21 of each of these slots is preferably enlarged along the side of the plate, as shown best in Figure 3, to facilitate entry of the pins 14.

The central region of the actuating plate originally bears an aperture through which passes, and into which is brazed or otherwise secured, a relatively massive post 23 having a polygonal head 24. Suitable lengths of the post protrude above and below the plate, and lie perpendicular thereto, for a purpose hereinafter made apparent.

Figure 3:
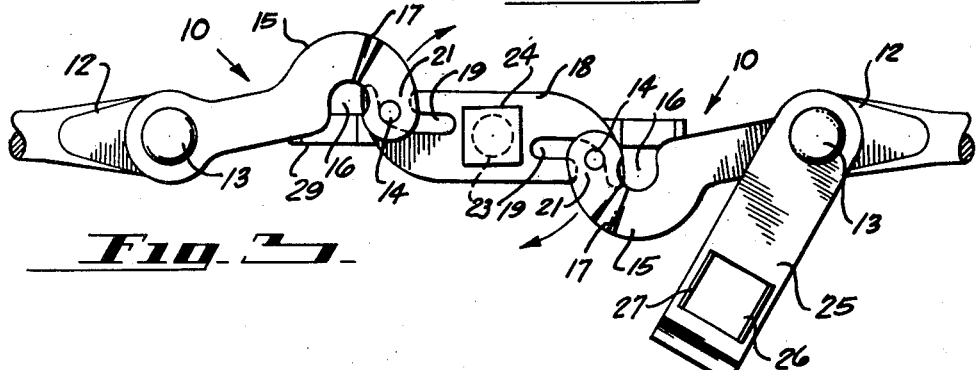
Figure 3 is a plan view of the connector with the parts in the positions they occupy in the initial stage of their connecting operation and in the terminal stage of their disconnecting operation.
Figure 4:
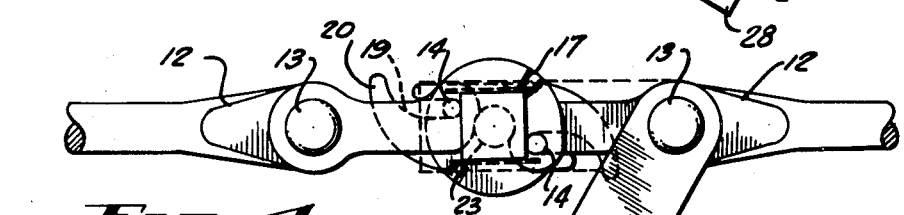
Figure 4 is a plan view of the connector in the operating condition, showing the safety-device out of engagement with the post.
Figure 5:
Figure 5 is a sectional view of the coupled connector taken along line 5—5 of Figure 2.
Figure 6:
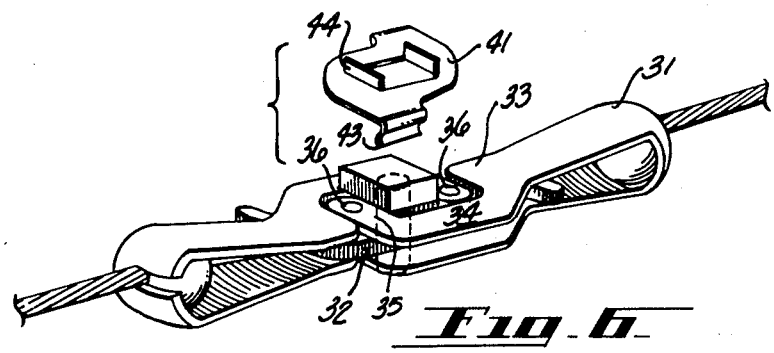
Figure 6 is a perspective of another species of the invention in operating condition, showing the safety device in expanded view.
Figure 7:
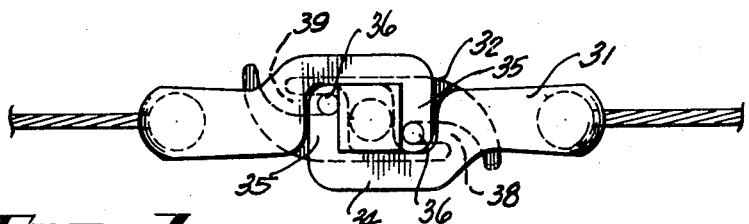
Figure 7 is a plan view of said embodiment with the safety device removed to more clearly illustrate the same.
Figure 8:
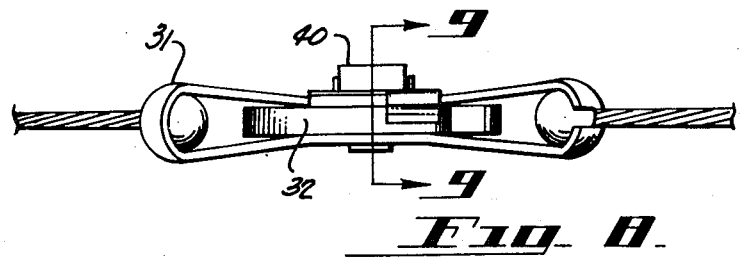
Figure 8 is a side-elevation thereof including the safety device.
Figure 9:
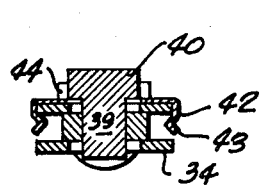
Figure 9 is a transverse sectional view of the coupled connector taken along line 9—9 of Figure 8.

In establishing the connection, the parts initially are put into the extended position, shown in Figure 3, the actuating plate then lying a half-turn, or 180°, away from its ultimate position shown in Figure 4. In this initial position of the connector parts, the pin 14 of the hooked portion lying to the leftward of the figure occupies the entrance of the then-leftward camming slot, and the pin of the other hooked portion lies at the entrance of the then-rightward slot.

Rotation of post 23 through substantially one-half of a turn, or 180°, in the clockwise direction, to close the connector, will then cause the actuating plate to cam the hooked portions first outwardly, then forwardly around opposite sides of the post. The terminal end of the one hooked portion, by virtue of the joggles constricting the plates thereof together, is, in this operation, adapted to fit transversely between the spaced parallel plates of the other link, and the terminal end of the other hook fits similarly between the spaced plates of the first link.

In the closed position of the connector, the pins 14 are disposed at the inner ends of the slots 19, almost in longitudinal alignment and substantially in a "dead-center" relationship with the plate. There is, however, a slight lateral distance between the inner end of each slot and the longitudinal axis of the plate, and an appropriate longitudinal distance separates these ends. The resultant small torsional couple exerted on the plate, acting only in the closed condition of the connector, is sufficient to maintain the hooked portions securely seated against the opposite sides of the post 23 until the actuating plate is positively rotated.

Once established in engaged position around the post, the hooks cannot be disengaged therefrom, unless the actuating plate is rotated. For, until turned, the slight torsional-couple described supra holds the pins in the inner ends of the slots, and the pins, being attached to the hooks, will positively maintain them in direct, secure engagement with the post.

For all normal service, this arrangement is sufficient in itself to prevent inadvertent uncoupling of the connector, but to positively hold the connector against inadvertent movement a special safety member may be provided. This member may consist essentially of an elongate arm 25, pivotally mounted at its outer end on the outer end of either one of the links by means of the clevis pins 13 there found. Near the inner end of this arm is a rectangular aperture 26, adapted to fit over the head 24 of the post 23 and permit seating of the arm on the closed connector. Struck up from the longitudinal edges of this aperture are flanges 27, for preventing lateral shifting of the actuating plate. At its inner extremity, the arm is formed with a transverse lip 28 to permit an operator to insert some tool under the same to flex the arm away from the link when it is desired to remove the safety member.

Thus, when in operative position, the safety member not only positively and directly restrains undesired rotation of the actuating plate, but the flanges thereof exert laterally inwardly acting opposite and equal thrusts on the head 24 of the post that maintain the actuating plate centered, with concomitant advantages. While it is in place, it is thus impossible for the connection to be disconnected by accidental blows or to work loose under vibrations. The safety member itself cannot be lost, being securely anchored by its one end to one of the outer links.

If desired, the end of the post 23 opposite to the headed end thereof may be furnished with an actuator 29 built into the post for use in rotating the actuating plate 18, and this actuator may be provided either in addition to, or in lieu of, the polygonal wrench receiving head 24. In this case, the connector may be directly operated by the fingers, instead of necessitating the employment of a wrench. The actuator 29 may, in one form, consist of a two-armed lever integral with, or attached to, the end of the post lying opposite to the headed end, the arms having a longitudinal dimension sufficient to provide optimum leverage, and preferably being of equal length, for equal leverage. In their normal position, these arms underlie the links, extending in parallelism therewith and the inner face of the outer end of each arm bears an outwardly extending depression 30, adapting each end to snap against, and fit snugly over, the head of the sub-adjacent clevis pin in the outer end of each link.

In the closed condition of the connector, all the parts lie in substantially longitudinal alignment, no part extending diagonally. Unless extreme conditions of misuse or wear have produced a great amount of play between the hooks and the post, no tension is, in this condition, brought to bear upon the actuating plate, all such loads being taken by the relatively massive and rigid center post 23. Because of the rectilinearity of the inner ends of the camming slots and their substantial longitudinal alignment, as well as their parallelism to the longitudinal axis of the actuating plate, no serious torsional strains are imposed upon this plate in the closed condition of the connector. Thereby, not only is the connector rendered easy to open and close, but the pins and slots are unlikely to be bent, burred or otherwise damaged by use, further facilitating its operation and prolonging its life.

The modified embodiment of the present invention depicted in Figures 6–10, inclusive, essentially includes a pair of outer links 31, which are invertible and interchangeable, and a centrally located actuating member 32 therefor which can also be inverted, if desired. Each of the outer links consists essentially of a single, integral piece in the form of a ribbon of metal bent inwardly upon itself, and having a substantially closed outer end and an open inner end, each of the inner ends comprising spacedly parallel planar portions 33. The one edge of each of the portions 33 is cut away, as shown, to form, at the outer end of each portion, a hook-like formation thereon, comprising a longitudinally extending wrist 34 and a transversely extending finger 35. The planar portions 33 are united by pins 36, which may be riveted in place or otherwise secured in position.

The actuating member 32 consists of a generally oblong plate adapted to lie intermediately of, and to be embraced by, the inner, vertically spaced ends of the links 31. The plate is of a thickness and surface condition sufficient to provide a smooth bearing or working surface for the adjacent faces of the reversely-bent link members.

Curvilinear slots 38 and 39 extend inwardly through the actuating plate 32 from each of the longer sides thereof, first running substantially transversely almost to the longitudinal axis of the plate, and then longitudinally towards the central region of the plate, substantially in parallelism with the longitudinal center line thereof. These slots are of a width sufficient to receive the pins 36. The innermost ends of these slots lie equal longitudinal distances from the center point of the plate on opposite sides of the longitudinal axis thereof. The mouths, or entrances, of these slots are preferably widened, or enlarged, as shown, to facilitate entry of the pins thereinto upon preliminary loose coupling of the cables preparatory to rotating the actuating plate and closing the connector, and for another purpose hereinafter explained.

The central portion of the actuating plate is provided with an aperture through which is sweated or brazed a relatively massive post member 39 here shown as a cylinder formed with a tool engaging head 40 at one end thereof.

The head 40 of the post is adapted to be engaged by a small end-wrench, and when rotated a half-turn or substantially 180° in the clockwise direction, carries the actuating plate, with the respective pins 36, riding in the respective slots 38 and 39 therein, through an equal angle in the same direction. The outer links, therefore, are moved simultaneously, their hooked inner ends first travelling laterally and forwardly together, and then, after each end has passed the post member, being urged inwardly around opposite sides of the post and into close inter-fitted contact therewith. This action establishes the desired connection between the cable portions and transforms all tensile forces into compressive stresses acting in the post.

In this position of the parts, the pins are located at the inner ends of the slots, almost in longitudinal alignment and substantially in a "dead center" relationship with the plate. There is, however, as in the preceding species, a slight lateral displacement between the inner end of each slot and the longitudinal axis of the plate, and an appropriate longitudinal distance separates these ends. The resultant small torsional couple exerted on the plate in the closed condition of the connector is sufficient to maintain the hooks of the links securely seated against the post, until the actuating plate is directly and positively rotated.

However, in the closed condition of the connector, the actuating plate itself serves essentially as a mere "floating" support, so to speak, for the hook-anchoring post, which latter resists all the tension exerted upon taking up the slack in the cables in connecting them, as well as all the tension set up in the cables in use.

By virtue of the shape and arrangement of the camming slots, only a small amount of torsion is developed, even in operating the actuating plate, rendering opening and closing easy. Bending of the camming pins is thus obviated, as well as burring of the sides of the slots.

Consequent also upon this novel construction and arrangement of parts, the half-turn rotation of the center post brings the central plate and the outer links into substantially longitudinal alignment with the cable runs and with the load. The lateral space occupied by the connector hence need not, if desired, be of any greater extent than the transverse width of the actuator plate. Indeed, if desired, the lateral dimension of the connected coupling may, by suitable design of the widths of the outer links and the actuator plate, be reduced to a value closely approximating the diameter of the cable fitting or terminator itself.

Figure 10:
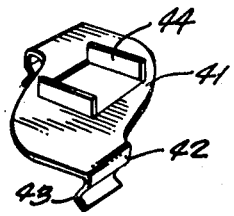
Figure 10 is an enlarged perspective of the safety device employable with this species of the invention.

Under all ordinary operating conditions and usages, the closed connector will, of itself, remain dependably locked, but in order to meet certain envisionable contingencies, a positively-acting securing, or safety, member, best seen in Figure 10, may be supplied for use with the article. This member is adapted to be applied around the post and around the central portion of the closed connector, primarily to prevent rotation of the actuating plate, and essentially consists of a clip-cap in the form of a generally serpentine, or S-shaped, apertured plate 41. This plate includes, at each end of the S, a downwardly-depending resilient ear 42, having inwardly extending lugs or clips 43. In this embodiment, these lugs are adapted to seize in the enlarged entrances, or mouths, of the curvilinear camming slots. When so positioned, the safety member will inhibit rotation of the center link and thus prevent the pins 36 from working out of the slots.

In order to preclude longitudinal displacement of the safety member, transverse ears 44 are struck up from the body of the plate and are adapted to be brought to bear against the head of the post by longitudinal thrusts coming onto the clip-cap. Lengthwise-acting forces tending to shift the lugs 42 out of the slot-entrances are thus effectively nullified.

Although the now preferred embodiments of the present invention have been shown and described herein it is to be understood that the invention is not to be limited thereto for it is susceptible to changes in form and detail within the scope of the appended claims.

I claim:

1. A connector, comprising: a seriate pair of laminar members each adapted at the outer end to engage a connectable member and being laterally indented near the inner end; a rotative member disposed intermediately of, and embraced by, said inner ends and including a transversely extending shear-resisting member adapted to be engaged by said lateral indentations; and cooperative means on said other ends and on said embraced member adapted, upon rotation of said rotative member, to effect movement of said other ends together and into interlocking engagement with opposite sides of said shear resisting member, whereby to transform, in the last-said member, the tensile forces of said connectible members into connection-establishing shear.

2. A connector, comprising: a seriate pair of members laminatedly bifurcated in the direction of their minimum dimension and each adapted at the one end to engage a connectible member, each of the furcations near the other end of said members having a lateral indentation; a rotative member including a transversely extending shear resisting portion, disposed intermediate of said other ends and embraced by said furcations, said furcations and said rotative member including mutually inter-engaging means positively organized, upon rotation of said rotative member, to carry said other ends towards each other and around and into engagement with opposite sides of said shear resisting member to establish the connection.

3. A connector, comprising: tension-member engaging outer links having, at their inner ends, hook like engaging means, and cam follower means extending transversely of said hooked ends; and a rotative central link including a transversely extending compressive member and having camming means therein for engaging the follower means and drawing the outer links into inter-fitted abutment around the compressive member to establish the connection, upon rotation of said central link.

4. A connector, comprising: elongate members each having tension-member engaging means at its outer end and having, at its inner end, a hook-like formation including detent means therein;

rotative planar means adapted to lie intermediate the inner ends of said elongate members and embraced thereby; means protruding in opposite directions from said planar means normal thereto and adapted to be engaged by said hook-like formations; and means in said planar means for camming the detent means centrally of said planar member to thereby urge said hook like members together around opposite sides of said protruding member.

5. A connector, comprising: outer links, each having a tension-member engager at its outer end, and a laminar grasping formation at its opposite end; detent means spacedly separating the laminations of said end portions of each grasping member; a planar member intermediate the grasping formations and embraced thereby and having means for camming said detents to draw the grasping formations together; and a rotatory member rigidly secured to said planar member and having portions protruding above and below same and adapted to be engaged by said drawn-together grasping formations to establish the connection.

6. A coupling device, comprising: alignable units for engaging the adjacent ends of seriate tension members, each unit having, at its inner end, parallel, transversely spaced plate-like members having recurved formations; cam follower means extending transversely between said plate like members at said inner ends; a rotative planar member lying intermediate said inner ends and embraceable thereby, said member having camming formations for engaging said followers; and a member for rotating said planar member rigidly attached thereto and having portions protruding oppositely from its major plane and adapted to be grasped, on their opposite sides, by said recurved formations upon rotation of said planar member.

7. A device for connecting members end-to-end, comprising: axially alignable outer links, each having, at its outer end, means for engaging one of the members to be connected and each having, at its inner end, hooked, plate-like members spaced in the direction normal to the plane of the links; cam follower means spacedly uniting the inner ends of said hooked members; a rotatory planar member lying substantially in the longitudinal center plane of the device, intermediate the inner ends of said links and embraced by said hooked members; a rotative member rigidly attached to said planar member and protruding from its upper and lower surfaces; and formations in the planar member for camming said plate uniting means centre-wardly of said planar member upon rotation of said rotative member, whereby to bring said hooks around opposite sides of said rigid rotative member.

8. In a coupling of the type that includes outer links having means at their inner ends adapting them to be drawn together and connected, means for drawing same together, comprising: a planar member adapted to lie intermediate of, and embraced by, the inner ends of said outer links; a curvilinear, non-arcuate slot extending from one end region of each of the two opposite sides of said planar member towards the central region thereof and adapted to engage said means in the inner ends of said outer links; and a rotative member passing engagedly through the central region of said planar member and having portions extending a substantial distance above and below said planar member.

9. In a connector of the type that includes outer links having means at their inner ends adapting them to be drawn together and connected to disconnectibly join seriate members, a central link for performing said function, comprising: a substantially oblong planar member adapted to lie substantially in the longitudinal center plane of the connector intermediate the inner ends of said outer links; a slot extending inwardly of said planar member from one end region of each of the longer sides of the oblong, running first substantially transversely of said planar member and then substantially longitudinally thereof towards the central region thereof; and means protruding from both faces of said planar member for transmitting rotatory forces thereto.

10. In a coupling of the type that includes outer links having means at their inner ends adapting them to be drawn together and connected, means for drawing same together, comprising: a planar member adapted to lie intermediate of, and embraced by, the inner ends of said outer links; a curvilinear, non-arcuate slot extending from one end region of each of the two opposite sides of said planar member towards the central region thereof and adapted to engage said means in the inner ends of said outer links; and a rotative member passing engagedly through the central region of said planar member and having portions extending a substantial distance above and below said planar member, the inner ends of said slots terminating a material distance from the last-said means.

11. In a connector of the type that includes outer links having means at their inner ends adapting them to be drawn together and connected to join seriate members, a central link for performing said function, comprising: a substantially quadrilateral, elongate planar member adapted to lie substantially in the longitudinal center plane of the connector intermediate the inner ends of said outer links; a slot extending inwardly of said planar member from one end region of each of the longer sides of the quadrilateral, running first substantially transversely of said planar member and then substantially longitudinally thereof towards the central region thereof; and means protruding from both faces of said planar member for transmitting rotatory forces thereto, and the longitudinally extending portions of said slots lying in substantial tangency to the longitudinal axis of said planar member, on opposite sides of said axis.

12. In a connector including tension-member engaging outer links, and a central link, having a rotatory portion, said central link being rotatable for engaging, and drawing together, said outer links and establishing the connection, means for preventing disengagement of said connection by preventing rotation of said central link, comprising: a planeal member having an aperture adapting same to fit over the rotation-producing portion of said central link, the edges of two of the opposite sides of said planeal member being adapted to resiliently engage around the sides of the abutted links.

13. In a connector including tension-member engaging outer links and a central link having a formation by which same may be rotated to effect engagement thereof with said outer links to draw same together and thereby establish the connection, means for preventing dis-establishment of said connection by preventing rotation of said central link, comprising: a plate like member having an aperture adapted to be received over the rotation producing formation of said central link, two opposite edges of said aperture extending upwardly into juxtaposition with said formation to prevent longitudinal displacement of said plate like member; two opposite edges of said plate like member extending in the opposite direction from the first said extensions into juxtaposition with the opposite sides of said central link, the outer ends of said latter extensions having inwardly extending lug formations.

14. In a connector that includes outer links and a rotative central link adapted to be rotated to draw the outer links together to establish the connection: a rigid member passing unitedly through the central region of said central link and protruding a substantial distance from each of the opposite faces thereof; a polygonal head on the end of one of said protruding portions adapted to receive a torsion-applying instrumentality, and a two armed lever rigidly connected in its central region to the end of the other of said protruding portions.

15. A connector, comprising: a pair of alignable links, each link comprising a pair of planar members; means for spacedly uniting the outer ends of each pair of planar members, said means constituting a cable terminal anchorable thereat; hook-like engaging means formed at the inner ends of said links; cam follower means uniting the inner ends of said hook-like members and adapted to be cammed to draw said links together; and a rotatable central link including a transversely extending compression-resisting member and having camming means therein for engaging the follower means and hook-like means into interfitted abutment around the compression-resisting member to establish the connection upon rotation of said central link; the planar members, at the inner ends of each link, being joggled towards each other to constrict said link transversely thereat, whereby to enable the inner end portion of one link to pass mediately of the spaced planar members of the other link.

16. In a connector, a pair of alignable outer links, each link comprising a strip of material bent upon itself, the bend including means for engaging a tension member, the ends of said strip opposite said bend being spaced apart in a direction normal to the plane of said ends and each end portion forming a planar member having a recurved formation adapted to serve as a grasping means; cam follower means uniting the ends of said recurved formations and adapted to be cammed to draw said links together; and a rotatable central link including a transversely extending compression-resisting member and having camming means therein for engaging the follower means and drawing the hook-like means into interfitted abutment around the compression-resisting member to establish the connection upon rotation of said central link.

PAUL JAMES BURCHETT.

REFERENCES CITED

The following references are of record in the file of this patent:

UNITED STATES PATENTS

| Number | Name | Date |
| --- | --- | --- |
| 1,420,460 | Sullivan | June 20, 1922 |
| 1,429,674 | Briggs | Sept. 19, 1922 |
| 2,097,048 | Statler | Oct. 26, 1937 |
| 2,236,649 | Proctor | Apr. 1, 1941 |
| 2,304,318 | Sava | Dec. 8, 1942 |

FOREIGN PATENTS

| Number | Country | Date |
| --- | --- | --- |
| 660,806 | France | 1929 |